United States Patent [19]
Kubouchi et al.

[11] Patent Number: 5,544,901
[45] Date of Patent: Aug. 13, 1996

[54] METAL GASKET FOR CHAIN CASE-CARRYING ENGINES

[75] Inventors: Kenji Kubouchi, Hirakata; Yuji Fukui; Kunitoshi Inoue, both of Higashiosaka, all of Japan

[73] Assignee: Nippon Gasket Co., Ltd., Osaka-fu, Japan

[21] Appl. No.: 452,396

[22] Filed: May 26, 1995

[30] Foreign Application Priority Data

Sep. 6, 1994 [JP] Japan ................................... 6-236050

[51] Int. Cl.⁶ ..................................................... F16J 15/06
[52] U.S. Cl. ............................................................ 277/235 B
[58] Field of Search .............................. 277/234, 235 R, 277/235 B, 236

[56] References Cited

U.S. PATENT DOCUMENTS

| | | | |
|---|---|---|---|
| 4,754,982 | 7/1988 | Udagawa et al. | 277/235 B |
| 4,962,939 | 10/1990 | Lonne et al. | 277/235 B |
| 5,121,933 | 6/1992 | Silvers | 277/235 B |
| 5,205,566 | 4/1993 | Ueta et al. | 277/235 B |
| 5,297,807 | 3/1994 | Udagawa | 277/235 B |

FOREIGN PATENT DOCUMENTS

| | | | |
|---|---|---|---|
| 531076 | 3/1993 | European Pat. Off. | 277/235 B |
| 2526912 | 11/1983 | France . | |
| 2350550 | 4/1975 | Germany . | |
| 4337758 | 1/1995 | Germany . | |
| 63-48059 | 4/1988 | Japan . | |
| 79471 | 3/1989 | Japan | 277/235 B |
| 327857 | 3/1991 | Japan . | |
| 327858 | 3/1991 | Japan . | |
| 405280645 | 10/1993 | Japan | 277/235 B |
| 2121123 | 12/1983 | United Kingdom . | |

*Primary Examiner*—William A. Cuchlinski, Jr.
*Assistant Examiner*—Scott W. Cummings
*Attorney, Agent, or Firm*—Browdy and Neimark

[57] ABSTRACT

This metal gasket for chain case-carrying engines is capable of reliably preventing the entry of an oil into height different parts, which occur on abutting surfaces of a cylinder block and a chain case, even when the oil deposited on the chain case scatters during a movement of a chain, and improving the reliability thereof owing to its durability. This metal gasket has first and second elastic metal plates provided with beads extending along an opening, in which the chain moves, and an intermediate plate provided with bores packed with seal members for sealing the height different parts occurring at the abutting surfaces of the chain case and cylinder block. The second elastic metal plate is provided with recesses formed by cutting out the portions thereof in which the seal members are positioned.

13 Claims, 6 Drawing Sheets

METAL GASKET FOR CHAIN CASE-CARRYING ENGINES

BACKGROUND OF THE INVENTION:

1. Field of the Invention

This invention relates to a metal gasket for chain case-carrying engines, wherein combustion chamber bore-carrying thin metal plates are laminated so as to seal with this laminate a narrow clearance between opposed surfaces of a chain case-carrying cylinder block and a cylinder head.

2. Description of the Prior Art

A conventional metal gasket for chain case-carrying engines is adapted to maintain in an air- or liquid tight state a narrow clearance between the upper surfaces of a cylinder block and a chain case, which are formed unitarily in an adjacently positioned state, and a lower surface of a cylinder head, and provided with primary seal portions which require a high seal surface pressure and auxiliary seal portions which require only a comparatively low seal surface pressure. An auxiliary seal portion of a low seal surface pressure is formed by extending at least one of the laminated thin metal plates, which constitute a primary seal portion, as a base member, and then bonding a soft sheet, such as a β-cellulose sheet, a graphite sheet or a compressed sheet to one surface or both surfaces of this extended base member. The known metal gaskets of this kind include the gaskets disclosed in Japanese Utility Model Laid-Open Nos. 48059/1988, 27857/1991 and 27858/1991.

In the metal gasket disclosed in Japanese Utility Model No. 27857/1991, a hole is made in the portion of a thin metal plate which is opposed to a height different part-carrying upper surface portion of a cylinder block or a height different part-carrying lower surface portion of a cylinder head so that the hole crosses a bead formed around a through bore, and a seal member is provided on the inner side of the hole with a part of the seal member projecting therefrom.

In an OHC type or DOHC type engine, a chain case 29 having a hollow space 33 in which a cam shaft driving chain moves is generally provided independently of and adjacently to a cylinder block 28 as shown in FIG. 11, and it is combined by bolts with the cylinder block 28 which is provided with cylinders, i.e. combustion chambers 35 therein. In this engine, a metal gasket is provided between the cylinder head and chain case 29 and the cylinder block 28. The cylinder head and chain case 29 are fixed to each other by bolts inserted in bolt holes 32. In this engine, a mounting side surface of the chain case 29 is formed in an opened state so as to reduce the weight of the chain case 29. The hollow space 33 is defined by an inner surface of the chain case 29 and a side surface of the cylinder block 28.

This engine has a structure in which separately formed parts are fixed to each other as mentioned above. Therefore, even when an upper surface 34 of the cylinder block 28 and that 31 of the chain case 29 are finished flat, it is unavoidable that height difference 30, though they are very small, occur between these upper surfaces at abutting surfaces 20 in a boundary between the cylinder block 28 and chain case 29, and that the height differences 30 become larger after the engine is used for a long period of time. When the height differences 30 occur between these upper surfaces, an oil, such as a lubricating oil is splashed, while a chain for driving a cam shaft moves in the chain case 29, over the height-differences and enters the chain case therefrom, the resultant oil leaking from the height-differences to the outside to enter a narrow space between the opposed surfaces of the cylinder block 28 and cylinder head.

Such a metal gasket formed by extending a thin metal sheet out of laminated thin metal sheets, which is positioned on the side of the cylinder block 28, as a base member, and bonding a soft sheet on one surface thereof, the air-tightness and liquid-tightness cannot be maintained due to the height differences 30. Such a metal gasket formed by extending an intermediately positioned thin metal plate as a base member, and bonding soft sheets to both surfaces thereof can maintain the air-tightness and liquid-tightness when the height differences 30 are extremely small but, when the height differences 30 become larger, the increasing of the thickness of the soft sheet is required so as to secure the sealing performance, and it becomes necessary to design the lamination of metal plates by determining the thickness of a primary seal portion taking the thickness of the soft sheet into consideration. In general, a β-cellulose sheet, a graphite sheet or a compressed sheet which constitutes the soft sheet has an original thickness of at least around 0.5 mm, so that it is necessary to set the thickness of a primary seal portion accordingly. In order to secure a high surface pressure at the primary seal portion, the number of thin metal sheets to be laminated is necessarily increased.

In this metal gasket, a hole is formed along a circumference of a through bore, and a seal member is provided on the inner side of the hole so that a part of the seal member projects from the hole. Around the circumference of the through bore, the sealability of portions opposed to the height different parts is maintained by the seal member provided on the inner side of the hole. Moreover, this seal member extends along the whole of the circumference of the through bore, and is not fitted in an intermediate plate.

In general, the height differences occurring between abutting surfaces of a cylinder block and a chain case include height differences occurring when the upper surface of the chain case is lower than that of the cylinder block, and height differences occurring when the upper surface of the chain case is higher than that of the cylinder block. When the upper surface of the chain case is lower than that of the cylinder block, the surface pressure of the chain case decreases with respect to the cylinder block, so that the surface pressure of the height different parts and chain case has to be taken into consideration. When the upper surface of the chain case is higher than that of the cylinder block, the surface pressure is concentrated on the chain case to cause the surface pressure of the cylinder block to decrease. The surface pressure of the circumference of a combustion chamber bore in the cylinder block requires to be at a high level, and, when a metal gasket is used, the regulating of a surface pressure becomes difficult.

Therefore, when height differences occur between the flat continuous lower surface of the cylinder head in this metal gasket and the upper surfaces of the cylinder block and chain case therein, the problem of preventing entry of an oil into the height different parts in the chain case has to be solved without taking a means for increasing the number of the thin metal plates in the laminate which causes the gasket manufacturing cost to increase greatly.

SUMMARY OF THE INVENTION

A primary object of the present invention is to solve this problem, and provide a metal gasket for chain case-carrying engines, adapted to seal a narrow clearance between the opposed surfaces of a cylinder block and a cylinder head, capable of preventing the leakage of an oil and water from height different parts, if any, between the portions of the upper surfaces of the cylinder block and a chain case which correspond to a boundary between (abutting surfaces of) the cylinder block and chain case by reliably providing a seal member in the regions of the height different parts, capable of improving the sealability of a region in the vicinity of the abutting surfaces, capable of easily regulating the surface pressure of the gasket between the cylinder head and cylinder block, capable of being manufactured at a low cost and having a high reliability.

Another object of the present invention is to provide a metal gasket for chain case-carrying engines, characterized in that the metal gasket is formed by laminated thin metal plates having combustion chamber bores and adapted to seal opposed surfaces of a cylinder block to which a chain case in which a cam shaft driving chain moves is fixed and a cylinder head, the laminate including first and second elastic metal plates and an intermediate plate inserted between these elastic metal plates, the first and second elastic metal plates being provided with beads extending along an opening in which the chain moves, the intermediate plate being provided with holes in which seal members for sealing height different parts occurring between the portions of the upper surfaces of the chain case and cylinder block which correspond to abutting surfaces thereof is provided, the holes extending from the abutting surfaces toward the chain case or across the abutting surfaces, the second elastic metal plate being provided with recesses formed by cutting out the portions thereof which correspond to regions in which the seal members are positioned.

Since this metal gasket is formed as mentioned above, the seal members can seal excellently and reliably the height different parts occurring in the regions corresponding to the abutting surfaces. The seal members positioned in the regions corresponding to the abutting surfaces of the chain case and cylinder block have substantially no influence upon the combustion chamber bores, and are capable of preventing the leakage of a high-temperature high-pressure combustion gas, which occurs in the combustion chamber bores, from the opposed surfaces to the outside and the leakage of a liquid, which flows in water bores and oil bores, from the opposed surfaces, and sealing a clearance between the opposed surfaces of the cylinder head and cylinder block reliably at a proper seal surface pressure. Moreover, this metal gasket has a simple construction, and can be manufactured easily and at a reduced cost.

Since this metal gasket is formed by coating the outer surfaces of the thin metal plates with a heat resisting resin or heat resisting rubber, the metal-to-metal contact between the thin metal plates and the metal-to-metal contact of the thin metal plates with respect to the upper surface of the cylinder block and the lower surface of the cylinder head can be avoided, and the durability of the metal gasket can be improved.

The second elastic metal plate is provided with folded portions formed along the combustion chamber bores in the intermediate plate, these folded portions functioning as stoppers for the beads extending along the combustion chamber bores in the intermediate plate.

The first elastic metal plate constituting a bead plate is provided on the cylinder head, and the second elastic metal plate on the cylinder block.

Even when height differences occur between the portions of the upper surfaces of the cylinder block and chain case which correspond to the abutting surfaces thereof, a side surface of the cylinder block and an inner surface of the chain case form a wall surface of a hollow space in the chain case, or, even when such height differences become comparatively large, the seal members of this metal gasket directly contact the height different surfaces and seal the height different regions excellently, so that the splashing of an oil with a movement of a chain in the chain case, the entry of the oil into the height different parts corresponding to the abutting surfaces and the leakage of the oil to the outside are prevented. Even the height differences between the mentioned upper surfaces which correspond to the abutting surfaces of the cylinder block and cylinder head become large to cause the seal surface pressure to decrease, the regions of the height differences can be sealed excellently if the thickness of the seal members is regulated properly in advance.

The length of the seal members is set to substantially a half of that of the holes in the intermediate plate. Accordingly, when the height differences mentioned above exists, the seal members are compressed between the cylinder head and chain case to cause the seal members to be deformed in the shape of wedges to ensure sealability, whereby a decrease in the sealability, which is ascribed to the decrease in the surface pressure between the cylinder head and chain case due to the height differences, can be offset.

The leakage of a high-temperature and high-pressure combustion gas, which occurs in the combustion chamber bores, from a clearance between the opposed surfaces of the cylinder block and cylinder head to the outside, and water and oil holes in which the leakage of liquids, which flow therein, from a narrow clearance between the mentioned opposed surfaces has to be perfectly prevented can be avoided and sealed reliably respectively by a high seal surface pressure of the primary seal portion of a plurality of laminated thin metal plates. Between the opposed surfaces of the chain case, which is formed by the cylinder block and a fixing side-opened type chain case body attained to a side surface of the cylinder block, and cylinder head, the region around the opening of the chain case is sealed at a comparatively low surface pressure by auxiliary seal portions.

This metal gasket effectively prevents the entry of the oil in the chain case into a clearance between the joint surfaces. Therefore, even when the height differences mentioned above at the abutting surfaces of the cylinder block and chain case increase, the satisfactory sealing performance can still be secured owing to the provision of the seal members, though the seal surface pressure further decreases when a conventional metal gasket is used. Accordingly, a metal gasket of a generally simple construction can be obtained, and a stable sealing performance can be displayed at a low cost. Moreover, it is possible to prevent the leakage of an oil from the height different parts reliably and stably, improve, especially, the sealability of regions in the vicinity of the contact surfaces, regulate the surface pressure easily between the cylinder head and cylinder block, reduce the manufacturing cost of the gasket and improve the reliability thereof.

Figure 11:
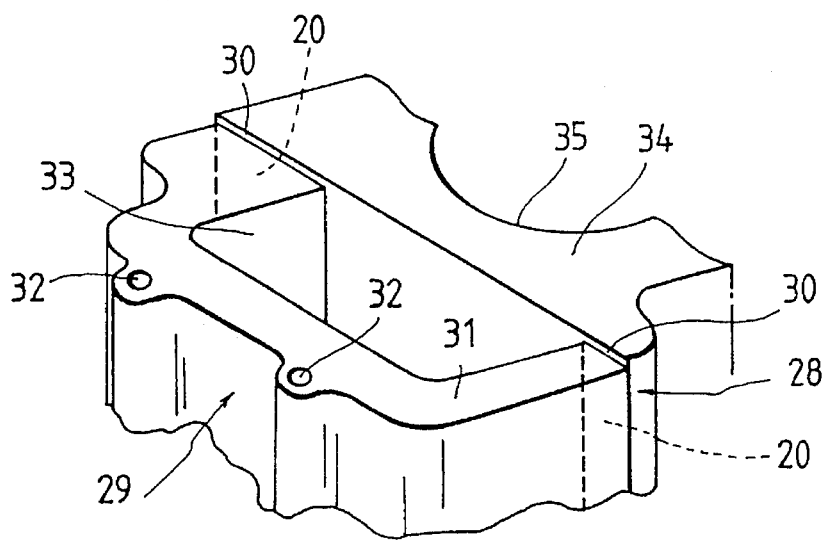
FIG. 11 is a perspective view showing an example of a chain case-carrying cylinder block.

DESCRIPTION OF THE PREFERRED EMBODIMENTS:

An embodiment of the metal gasket for chain case-carrying engines according to the present invention will now be described with reference to FIGS. 1–7. This metal gasket is adapted to seal a clearance between the opposed surfaces of a cylinder block 28 and chain case 29 and a cylinder head (not shown) which are shown in FIG. 11. The chain case 29 is formed as a separate part with respect to the cylinder block 28, and fixed to a side surface of the cylinder block 28. The chain case 29 is opened at the side wall thereof which is fixed to the cylinder block 2, so as to reduce the weight thereof. The chain case 29 is U-shaped in horizontal section, and provided at two portions thereof with joint surfaces, i.e. abutting surfaces 20 with respect to the cylinder block 28. An inner surface of the chain case 29 and a side surface of the cylinder block 28 define a hollow space 33 in which a chain for driving a cam shaft moves.

This metal gasket includes a primary seal portion 1, and an auxiliary seal portion 2 having a thin metal plate formed by integrally extending part of thin metal plates constituting the primary seal portion 1. The primary seal portion 1 is a seal portion interposed between an upper surface 34 of the cylinder block 28 and a lower surface of a cylinder head, and adapted to seal the circumferential regions of various kinds of bores and holes, such as combustion chamber bores 3 formed correspondingly to cylinders in the engine, i.e. combustion chambers 35, knock holes 21, bolt holes 22 and water holes. The auxiliary seal portion 2 is adapted to seal opposed surfaces, one of which is a combination of an upper surface 31 forming the hollow space 33 of the chain case 29 and an upper surface 34 adjacent to a side surface of the cylinder block 28 to which the chain case 29 is fixed, and the other of which is a lower Surface of the cylinder head which extends continuously flat just as one opposed surface of the primary seal portion 1. In this embodiment of the metal gasket, the primary and auxiliary seal portions 1, 2 are formed integrally and continuously.

This metal gasket is adapted to seal a narrow clearance between the opposed surfaces of a cylinder block to which a chain case in which a cam shaft driving chain moves is fixed and a cylinder head, and formed by a laminate of three thin metal plates constituting a primary seal portion 1 and an auxiliary seal portion 2 and provided with combustion chamber bores 3. The three thin metal plates include first and second elastic metal plates 5, 7 provided on both sides, and an intermediate plate 6 provided between the two elastic metal plates. The elastic metal plate 5 constitutes a bead plate positioned on the side of the cylinder head, the elastic metal plate 7 a stopper plate positioned on the side of the cylinder block 28, and the intermediate plate 6 a regulating plate having the function of regulating a tightening thickness.

The elastic metal plate 5 is provided with a bead 8 extending around an opening 4 formed therein correspondingly to the hollow space 33 in the chain case 29. The intermediate plate 6 is provided with rectangular bores 10 into which seal members 25 for sealing height different parts 30 occurring at abutting surfaces 20 in a boundary between the chain case 29 and cylinder block 28 are fitted, and these bores 10 extend from the abutting surfaces 20 at right angles thereto at least toward the chain case 29. The elastic metal plate 7 is provided with a bead 9 extending along the circumference of the opening 4, and also rectangular recesses 11 formed by cutting out the regions thereof in which the seal members 25 are positioned, in such a manner that the recesses 11 extend shunting the seal members 25 fitted in the intermediate plate 6.

In this embodiment, the seal members 25 are formed out of a nonmetallic material, such as a heat resisting resin or silicone rubber to a cylindrical shape so that they fit in the rectangular bores 10. The thickness of the seal members 25 is set larger than that (0.60 mm) of the intermediate plate 6, for example, two times (1.2 mm in diameter or thickness) as large as the thickness of the intermediate plate 6. The length L of each seal member 25 is set to substantially a half of the width of the opening 4 of the chain case 29. Let H equal a distance between the center of a bolt hole 24, which is provided for fixing the metal gasket to the chain case 29, and an abutting surface 20. Accordingly, the equation $L=(\frac{1}{2}) \cdot H$ is substantially established. The bolt holes 24 are made in the portions of the metal gasket which are opposed to the bolt holes 32 made in the chain case 29. Since the size of the seal members 25 is set as mentioned above, the height differences 30 occurring in the abutting surfaces 20 are offset sufficiently, so that the sealing performance of the seal members 25 can be improved.

When the thin metal plates are laminated, it is preferable that the elastic metal plate 5 positioned on the side of the cylinder head be formed out of a material of a high processability so that the metal plate 5 easily follows up the cylinder head which is deformed more easily than the cylinder block 28, whereby leakage paths are minimized. The material for forming the three thin metal plates can be selectively set. For example, the elastic metal plate 5 is formed out of SUS 301 having a hardness of Hv 300–500. The elastic metal plate 7 is formed out of SUS 304 or SUS 430 having a hardness of Hv 150–200. The intermediate plate 6 is formed out of SUS 430 or SPC having a hardness of Hv 150–200.

Figure 1:
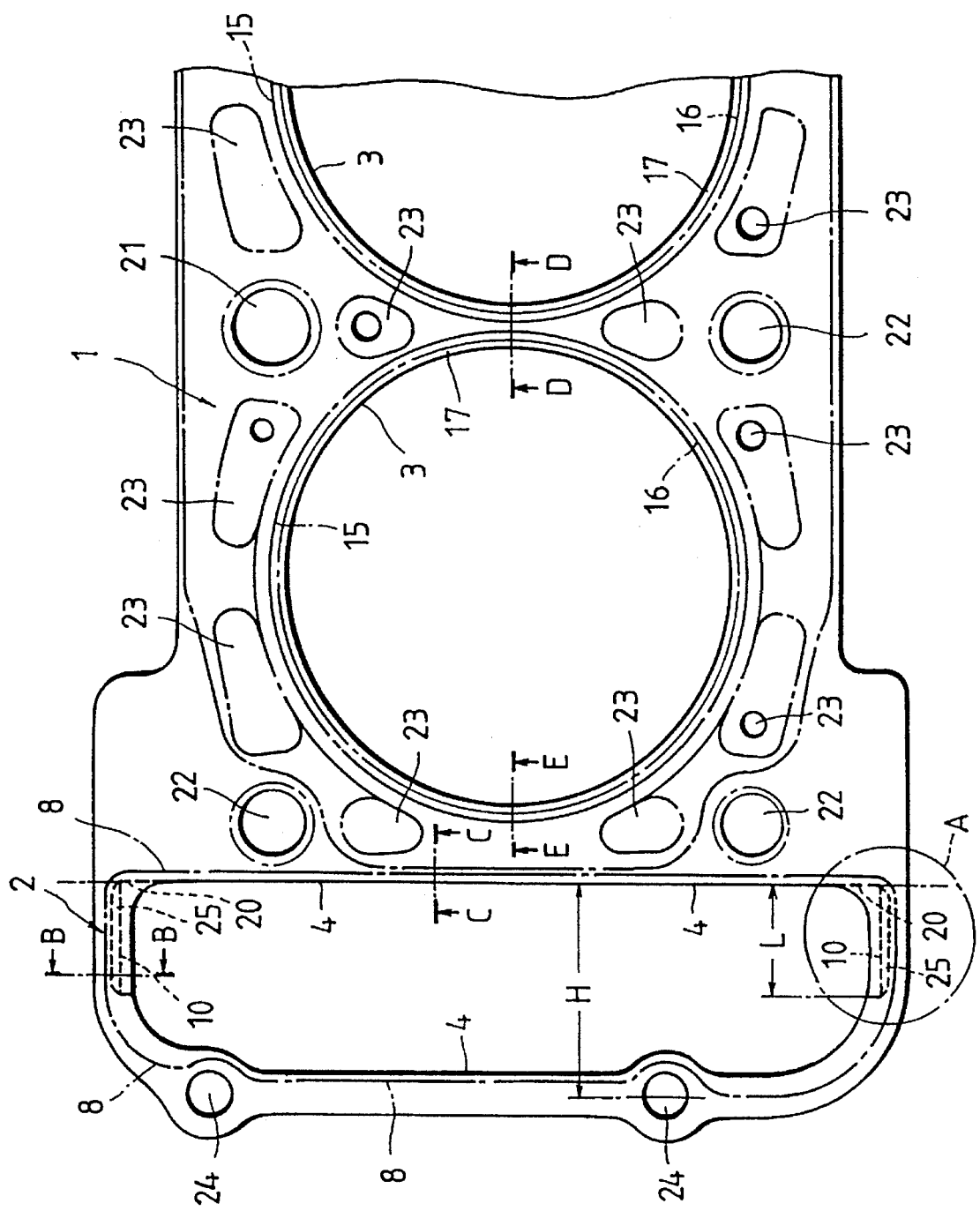
FIG. 1 is a partial plan view showing an embodiment of the metal gasket for chain case-carrying engines according to the present invention.
Figure 2:
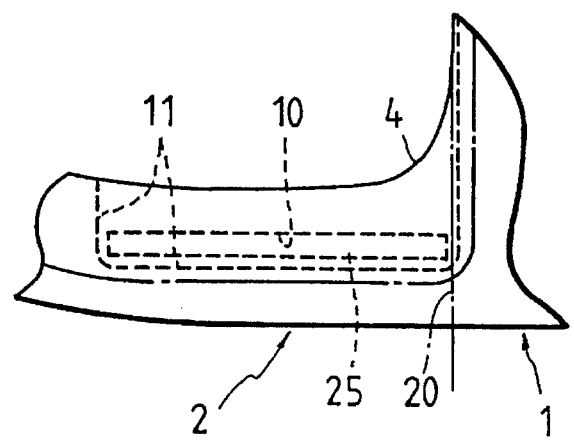
FIG. 2 is an enlarged plan view of a portion of a reference letter A of the embodiment of FIG. 1.
Figure 3:
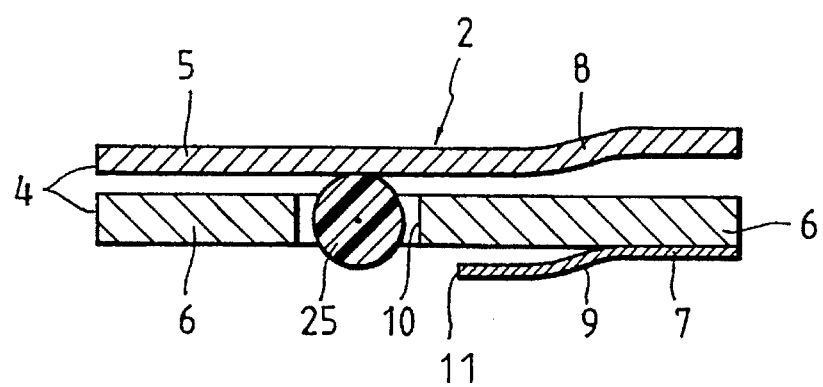
FIG. 3 is a sectional view taken along the line B—B in FIG. 1.
Figure 4:
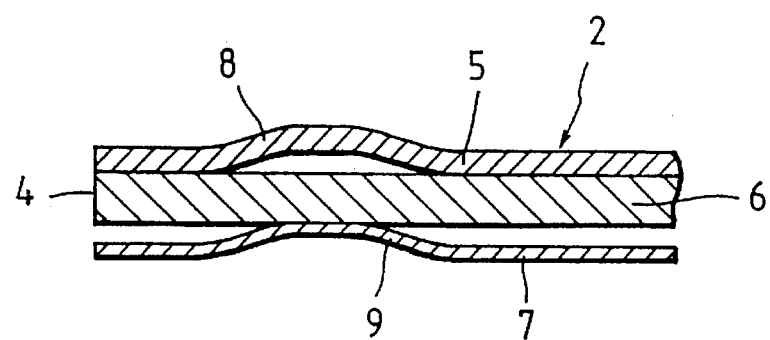
FIG. 4 is a sectional view taken along the line C—C in FIG. 1.
Figure 5:
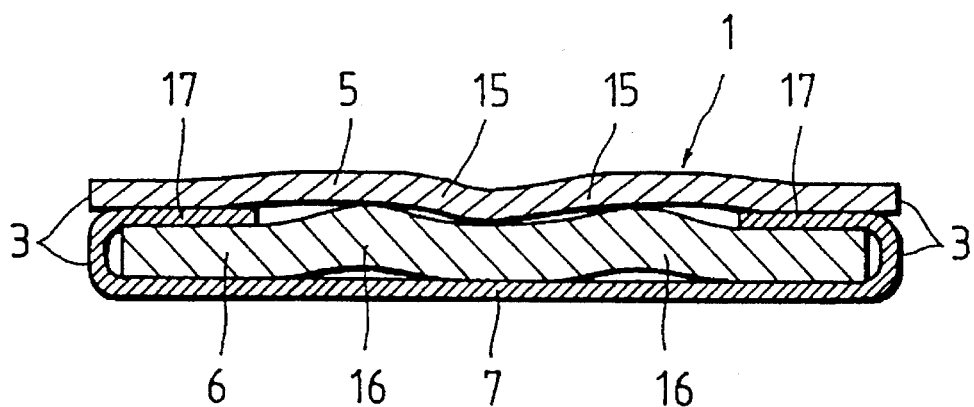
FIG. 5 is a sectional view taken along the line D—D in FIG. 1.
Figure 6:
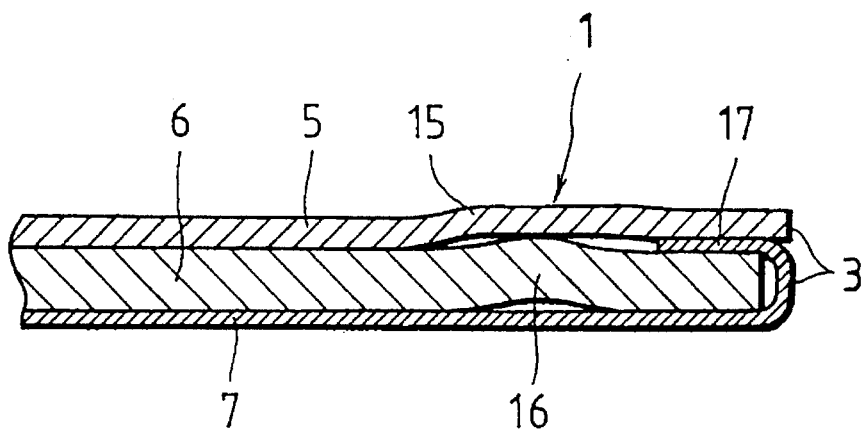
FIG. 6 is a sectional view taken along the line E—E in FIG. 1.
Figure 7:
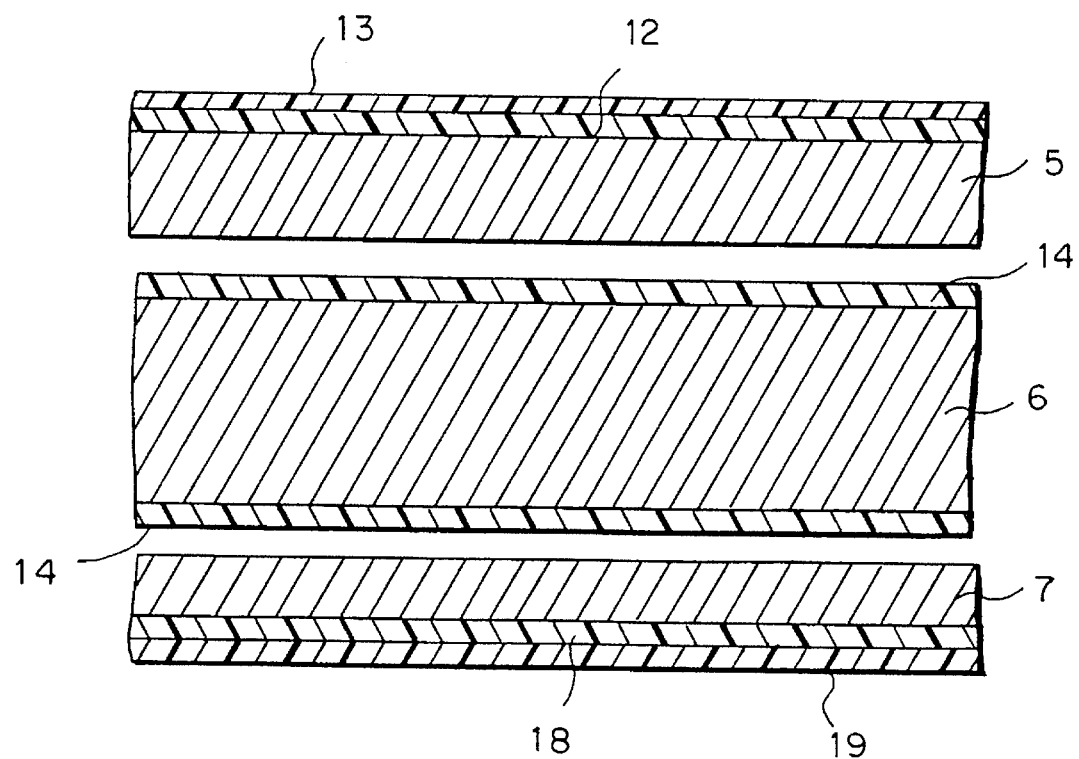
FIG. 7 is a sectional view showing the construction of each thin metal plate in the metal gasket for chain case-carrying engine of FIG. 1.

As shown in FIG. 7, the metal gasket is formed by subjecting the thin metal plates to heat treatment, and coating the upper and lower surfaces thereof with nonmetallic material. For example, the elastic metal plate 5 is coated with fluororubber 12 and acrylic silicone 13, the intermediate plate 6 silicone rubber 14, and the elastic metal plate 7 fluororubber 18 and acrylic silicone 19. Thus, the metal-to-metal contacting condition between the thin metal plates and between the cylinder head and cylinder block can be avoided, and the corrosion resistance, durability and strength of the metal gasket can be secured. Even when there are minute recesses and projections in and on a mechanically processed surface of the metal gasket, these nonmetallic materials cover them, and the metal gasket can fulfil its sealing function satisfactorily.

The elastic metal plates 5, 7 and intermediate plate 6 are provided with combustion chamber bores 3 correspondingly to the combustion chambers 35 in the cylinder block 28, and openings 4 correspondingly to the hollow space 33 in the chain case 29. The elastic metal plate 5 is provided on the portion thereof which is spaced from an inner edge of the combustion chamber bore 3 slightly in the radial direction thereof with a cross-sectionally mountain-shaped bead 15 which extends concentrically with and surrounds angularly the combustion chamber bore 3 so as to form the primary seal portion 1, this bead 15 extending toward the intermediate plate 6 to contact the same. The elastic metal plate 7 has a folded portion 17 formed by turning up the portion thereof which is around the combustion chamber bore 3 toward the elastic metal plate 5. The width of the folded portion 17 is so set that the folded portion is not superposed on a bead 16 on the intermediate plate 6. The folded portion 17 restricts the deformation of the portion of the intermediate plate 6 which corresponds to an inner end of the combustion chamber bore 3, and it serves effectively as a means for preventing the permanent set in fatigue of the intermediate plate 6. The thickness of the folded portion 17 can be regulated by increasing or decreasing a plastic deformation rate for a folded operation.

The intermediate plate 6, i.e. a thin metal regulating plate is interposed between the plastic metal plates 5, 7 so as to reinforce the metal gasket and control the thickness thereof. The intermediate plate 6 is provided with a bead 16 on the portion thereof which is around the combustion chamber bore 3 and closer to the combustion chamber bore 3 than the bead 15 on the elastic metal plate 5. The bead 16 is formed so that a projecting surface thereof is opposed to the elastic metal plate 5. The intermediate plate 6 can be regulated at the portion thereof which is around the combustion chamber bore 3 relatively to the thickness of the portion of the elastic metal plate 7 which is in the region of the folded portion 17 and the height of the bead 15.

When the metal gasket is held between the opposed surfaces of the cylinder head and cylinder block 28 and tightened, the beads 15, 16 provided on the portions of the elastic metal plates 5, 7 which are in the vicinity of the combustion chamber bore 3 come into contact with the opposed surface of the cylinder head which is around the combustion chamber bore 3 to form double annular seal portions. At the portion of the elastic metal plate 5 which corresponds to an inner edge portion of the combustion chamber bore 3, a seal pressure against the cylinder head and cylinder block becomes higher correspondingly to the increased thickness due to the folded portion 17 to form a seal portion on the inner edge portion of the combustion chamber bore 3. Owing to the three-stage annular seal portions, the leakage of a high-temperature high-pressure combustion gas from the combustion chamber bores 3 to both opposed fixing surfaces can be prevented. Owing to an increase in the annular seal portions and the offsetting of the non-alignment of the opposed fixing surfaces, the amount of strain of the cylinder head occurring due to the repetition of explosion and expansion strokes of an internal combustion engine during a combustion cycle is minimized. The tightening force is supported in a divided manner on the beads 15, 16 and the inner edge portions of the combustion chamber bores 3, so that the stress occurring in the beads 15, 16 during the tightening of the metal gasket is lessened. Accordingly, the total compression of the metal gasket does not occur, and the occurrence of permanent set in fatigue of and cracks in the beads 15, 16 can be prevented.

In this embodiment, the auxiliary seal portion 2 includes the extensions of three thin metal plates, i.e. the elastic metal plates 5, 7 and intermediate plate 6, which constitute the primary seal portion 1, to the circumference of the upper surface of the opening 4 of the chain case. The elastic metal plates 5, 7 and intermediate plate 6 extend to the upper surface of the circumference of the opening 4. The elastic metal plates 5, 7 are provided with beads 8, 9 extending along the hollow space of the chain case in the same manner as the beads on the primary seal portion 1 so as to form the auxiliary seal portion 2.

Figure 8:
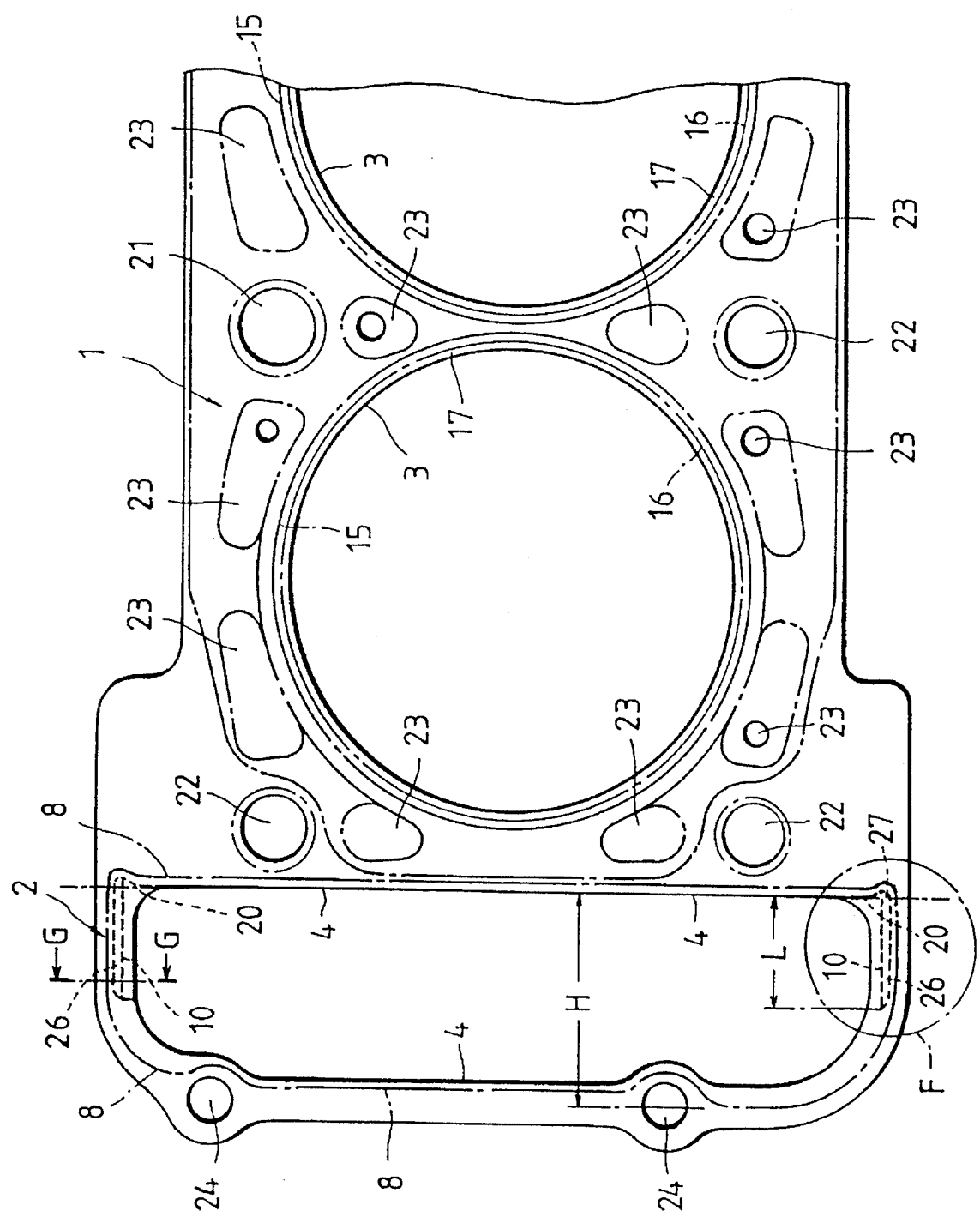
FIG. 8 is a plan view showing another embodiment of the metal gasket for chain case-carrying engines according to the present invention.
Figure 9:
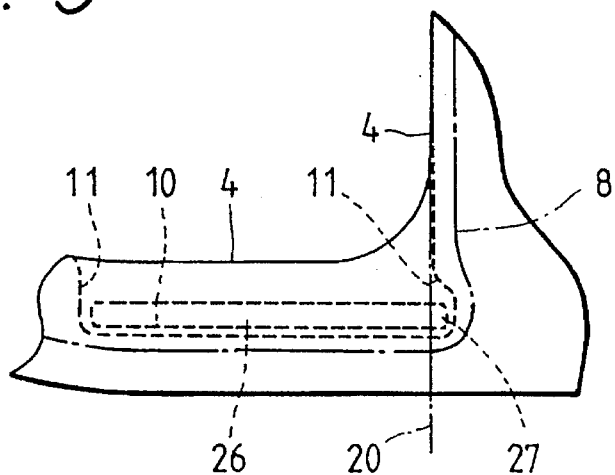
FIG. 9 is an enlarged plan view of a portion of a reference letter F of the embodiment of FIG. 8.
Figure 10:
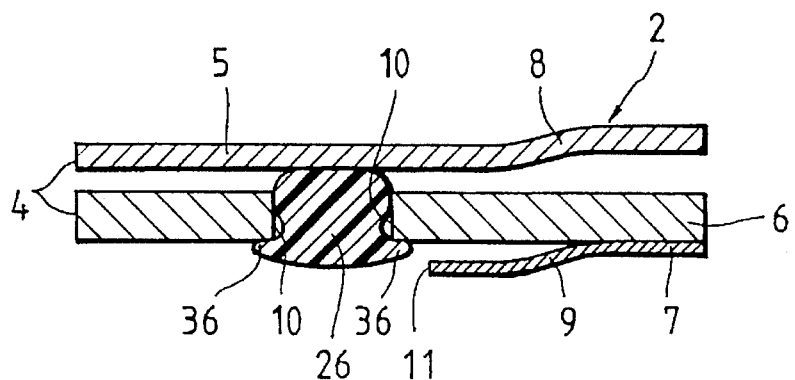
FIG. 10 is a sectional view taken along the line B—B in FIG. 8.

Another embodiment of the metal gasket according to the present invention will now be described with reference to FIGS. 8, 9 and 10. This embodiment has the same construction as the above-described embodiment except that bores formed in an intermediate plate extend across abutting surfaces 20. Therefore, the same parts are designated by the same reference numerals, and the duplication of descriptions thereof are omitted.

In the second embodiment, the bores 10 formed in the intermediate plate 6 extend from the abutting surfaces 20 over a part of a cylinder block 28 so as to have a rectangular cross-sectional shape. In other words, the bores 10 cross the abutting surfaces 20 at substantially right angles thereto so as to have openings extending over a part of the cylinder block 28. The seal members 26 fitted in the bores 10 have extensions 27 positioned in the openings extending from the abutting surfaces 20 in a boundary between the cylinder block and chain case over a part of the cylinder block 28, the extensions 27 being provided so as to contact both the upper surface 31 of the chain case 29 and that 34 of the cylinder block 28. The seal members 26 are fitted in the bores 10 of the intermediate plate 6, and provided with flanges 36 contacting the surface of the intermediate plate 6 which is on the side of the elastic metal plate 7 and extending along the bores 10. Accordingly, even when the abutting surfaces 20 have height differences 30, the seal members 26 can offset the height differences satisfactorily and display their sealing performance. Although the seal members are formed to the abovedescribed shapes as examples, the shapes thereof are not necessarily limited to the shapes referred to in the above embodiments. The shape of the seal members can be set to various ones in accordance with the type of the relative engine, and the material thereof can also be selected variously.

What is claimed is:

1. A metal gasket for chain case-carrying engines of the type having a cylinder block, a chain case affixed to the cylinder block, the chain case having therein a hollow space in which a chain moves, and a cylinder head, the gasket comprising:

three thin laminated metal plates for location over the cylinder block and the chain case, the cylinder head adapted to be fixed to the cylinder block, said thin metal plates are provided with combustion chamber openings, said thin metal plates including first and second elastic metal plates provided as both side members of a laminate of said three plates, and an intermediate plate provided between said first and second elastic metal plates, each of said first and second elastic metal plates and said intermediate plate being provided with an opening through which said chain moving in said hollow space of said chain case moves, each of said first and second elastic metal plates being provided with a bead extending along said opening, said intermediate plate being provided with bores which in use of said metal gasket will extend from abutting surfaces in a boundary between the chain case and the cylinder block over the chain case, said bores being packed with seal members for sealing a height difference occurring at upper surfaces of the chain case and the cylinder block which correspond to the abutting surfaces when said metal gasket is located in use between the cylinder block and the cylinder head, said second elastic metal plate being provided with recesses formed by cutting out the portions thereof which correspond to regions in which said seal members are positioned, said first elastic metal plate and said intermediate plate extending over said recesses formed in said second elastic metal plate.

2. A metal gasket for chain case-carrying engines according to claim 1, wherein said bores formed in said intermediate plate cross said abutting surfaces and extend over a part of said cylinder block, said seal members extending over both said cylinder block and said chain case.

3. A metal gasket for chain case-carrying engines according to claim 1, wherein the length of said seal members is set to substantially a half of the width of said opening of said intermediate plate.

4. A metal gasket for chain case-carrying engines according to claim 1, wherein the surfaces of said thin metal plates are coated with a heat resisting resin.

5. A metal gasket for chain case-carrying engines according to claim 1, wherein the surfaces of said thin metal plates are coated with heat resisting rubber.

6. A metal gasket for chain case-carrying engines according to claim 1, wherein said second elastic metal plate is provided with folded portions formed by bending parts thereof along said combustion chamber openings of said intermediate plate.

7. A metal gasket for chain case-carrying engines according to claim 1, wherein said first elastic metal plate constitutes a bead plate and is provided on the side of said cylinder head, said second elastic metal plate being provided on the side of said cylinder block.

8. In an engine gasket for sealing in a first region (1) between a cylinder head and an engine block and for sealing in a contiguous second region (2) between the cylinder head and a timing chain case; the improvement comprising:

the gasket comprising a metallic first plate (5) for contact with the cylinder head, a metallic second plate (7) for contact with the engine block, and a metallic intermediate plate (6) disposed between the first plate and the second plate;

the gasket including a chain opening substantially in the second region;

first plate including a first bead and the second plate including a second bead, the first bead and the second bead lying along a bead line, the bead line surrounding the chain opening;

the first plate and intermediate plate extending inward from the bead line, over a second-plate recess wherein the second plate is absent, to the chain opening;

the intermediate plate including a bore slot which in use is disposed between the cylinder head and the chain case; and a non-metallic elastomer seal member being disposed within the bore slot;

whereby the seal member contacts the first plate and the chain case; and whereby the gasket is capable of sealing over a step (30) between the engine block and the chain case.

9. The improvement according to claim 8, wherein the seal member is thicker than the intermediate plate.

10. The improvement according to claim 9, wherein the seal member is two times as thick as the intermediate plate.

11. The improvement according to claim 8, wherein the seal member includes one of a heat-resisting resin and a silicone rubber.

12. The improvement according to claim 8, wherein the seal member extends over the chain case, from a joint (20) between the engine block and the chain case, a distance substantially equal to at least half a width of the chain opening.

13. The improvement according to claim 8, wherein the seal member extends over the engine block from a joint (20) between the engine block and the chain case.

* * * * *